United States Patent [19]

Laber

[11] 4,198,628
[45] Apr. 15, 1980

[54] CIRCUIT ARRANGEMENT FOR DETECTING GROUNDS IN A STATIC CONVERTER

[75] Inventor: Hans Laber, Erlangen, Fed. Rep. of Germany

[73] Assignee: Siemens Aktiengesellschaft, Munich, Fed. Rep. of Germany

[21] Appl. No.: 889,523

[22] Filed: Mar. 23, 1978

[30] Foreign Application Priority Data

Apr. 14, 1977 [DE] Fed. Rep. of Germany ....... 2716605

[51] Int. Cl.² ............................................. G08B 21/00
[52] U.S. Cl. ..................................... 340/650; 324/51; 361/47
[58] Field of Search .................. 340/650, 651; 324/51; 361/47, 42

[56] References Cited

U.S. PATENT DOCUMENTS

| | | | |
|---|---|---|---|
| 1,270,894 | 7/1918 | Steinmetz | 340/651 |
| 2,428,563 | 10/1947 | Fountain | 361/42 |
| 3,293,497 | 12/1966 | Brandler et al. | 324/51 |
| 3,852,641 | 12/1974 | Titus | 361/47 |
| 4,099,215 | 7/1978 | Parrier et al. | 361/47 |

Primary Examiner—Glen R. Swann, III
Attorney, Agent, or Firm—Kenyon & Kenyon

[57] ABSTRACT

Three voltage transformers have primary windings whose first ends are connected, respectively, to three a-c leads of a static converter and whose second ends are connected together to form an artificial neutral point. A high value resistor is connected between the neutral point and ground and a current-measuring means measures the current flowing in the resistor and generates an alarm signal in the event such current indicates a ground in the converter. Also disclosed is an arrangement including two high voltage converters connected to each other through smoothing chokes to form a frequency changer or converter in which the two converters have substantially identical circuit arrangements for detecting grounds with the circuit arrangements for detecting grounds having their outputs connected to each other.

13 Claims, 3 Drawing Figures

CIRCUIT ARRANGEMENT FOR DETECTING GROUNDS IN A STATIC CONVERTER

BACKGROUND OF THE INVENTION

1. Field of the Invention

The invention relates to apparatus for detecting grounds in high voltage static converters in general, and more particularly to apparatus including a circuit arrangement for detecting grounds in a high-voltage static converter having three a-c leads, wherein the circuit arrangement comprises: three electrical components each having first and second leads or terminals, the first leads of these components being connected to the a-c leads of the converter, respectively, and the second leads being connected together to form an artificial neutral point; and a current-measuring circuit means connected between the artificial neutral point and ground for delivering an alarm signal in the event of a ground of the converter.

2. Description of the Prior Art

In the operation of an electrical system, it is frequently necessary to quickly and reliably detect and indicate the occurrence in the system of a short circuit to ground. This permits the sounding of a trouble alarm and/or the taking of other protective measures without any significant delay. Such a short circuit to ground may be due to a direct low-resistance connection ("full ground") between a point of the system and ground or to a connection with resistance between such point and ground. The latter type connections occur, for example, when the insulation of the system is inadequate, thereby promoting the development of leakage currents or arcs.

Siemens-Zeitschrift 46 (1972), no. 12, pages 909 to 911, particularly FIG. 1, discloses an apparatus which includes a circuit arrangement for detecting grounds in the stator winding of a high-voltage electric machine. This circuit arrangement comprises, amongst other components, a grounding transformer having a primary winding formed of three windings each having fist and second ends. The first ends of these windings are connected to the respective three phase conductors of the machine and the second ends of the windings are connected together to form an artificial neutral point which is directly connected to ground. The grounding transformer has a secondary winding which also includes three windings, these windings being connected together to form an open triangle or delta circuit. A supplementary 20 Hz voltage is fed to the delta circuit so that the three-phase system is maintained at a potential above ground. An alarm signal for indicating the occurrence of a ground is derived from a further transformer which is arranged on the secondary side of the grounding transformer.

Such a circuit arrangement cannot, however, be used for monitoring grounds in an a-c voltage system which is metallically connected (d-c coupled) to a static converter. This is so because the displacement voltage arising during a short to ground in such a system can include a d-c component. A d-c component always occurs when the d-c side of the converter is grounded, i.e., when the plus or minus lead of the converter is connected to ground via a larger or smaller resistance. The latter grounding can occur, for example, when due to defective insulation, a short occurs between the primary and secondary winding of the trigger transformer of one of the controlled electric valves of the converter. In any case, the occurrence of a d-c component in the displacement voltage would cause a large current to flow in the primary winding of the grounding transformer of the aforesaid ground detecting circuit arrangement and would thereby lead to malfunctioning or even to the total destruction of the transformer.

The text "Fehler and Fehlerschutz in elektrischen Drehstromanlagen" (Faults and fault protection in electrical three-phase systems) by H. Titze, vol. 2, Springer-Verlag, Vienna 1953, page 68 discloses a further apparatus including a circuit arrangement for detecting grounds. In this circuit arrangement, three voltage transformers are employed. The first ends of the primary windings of these voltage transformers are connected respectively to three a-c conductors and the second ends are connected together to form a common artificial neutral point. This artificial neutral point is again connected directly to ground. In this circuit arrangement, the three secondary windings of the transformers are delta connected and a voltage is derived therefrom which corresponds to three times the displacement voltage.

Again with this circuit arrangement, the occurrence of a d-c component in the displacement voltage can lead to grave malfunctions. Thus, such a d-c component, even if of a relatively small value, can cause the voltage transformers to go into saturation. This circuit arrangement, therefore, also cannot be used for detecting grounds in a static converter.

Siemens Brochure LE 2, 1975, pages 6/65 to 6/68, Section "Elektronischer Erdschlusswaechter EEW 1" (Electronic Ground Monitor EEW 1) discloses a further apparatus which includes a circuit arrangement for detecting grounding of a static converter via the converter insulation. This circuit arrangement contains three high-resistance, purely ohmic resistors, whose first ends are connected to the a-c leads of the converter. The second ends of the resistors, in turn, are connected together to jointly form an artificial neutral point. An auxiliary winding of a current detection circuit including a toroidal-core transformer is connected between this neutral point and ground. In undisturbed operation, the measured displacement voltage is zero, and no ground current flows through the auxiliary winding of the detection circuit. In the event of a ground, however, a finite resistance to ground results between the three-phase network connected to the converter and ground. This causes a certain amount of asymmetry of the phase voltage relative to ground and an appreciable ground current now flows through the auxiliary winding. This ground current flow is sensed by the toroidal-core transformer, which in response thereto develops an alarm signal. After further transformation and amplification, the latter alarm signal is used to activate a disconnect relay.

In the last discussed circuit arrangement, the occurrence of a d-c component in the displacement voltage will not jeopardize operation of the circuit. However, the above-mentioned resistors of this arrangement are always under load i.e., are under load not only in the event of a ground, but also during normal operation of the converter. The three resistors must, thus, be designed not only for high voltage but also for continuous operation. As a result, the resistors are difficult to obtain and very costly. Moreover, such resistors occupy a great deal of space, so that they necessitate a considerably large volume in the circuit arrangement. Also, these resistors are disadvantageous due to their continuous power loss and the heat they produce.

It is, therefore, an object of the present invention to provide a circuit arrangement for detecting grounds in a static converter which uses only a small amount of power during the normal operation of the converter and which is additionally capable in the event of a ground of handling a displacement voltage containing a d-c component.

SUMMARY OF THE INVENTION

In accordance with the principles of the present invention, the above and other objectives are realized in an apparatus comprising a circuit arrangement wherein three electrical components formed by the primary windings of three voltage transformers have their first ends connected to the three a-c leads of the static converter and their second ends connected together to form an artificial neutral point, and wherein a series circuit of a high-resistance resistor and a current measuring circuit means is connected between the artificial neutral point and ground.

The circuit arrangement of the invention thus comprises three voltage transformers which form an artificial neutral point on their primary sides; a high value resistor, and a current-measuring circuit with a resistance low relative thereto. Operation of the circuit arrangement, in turn, is based on measuring the displacement voltage by measuring the current in the high value resistor. Advantageously, the latter resistor should be designed so that the magnetic d-c bias of the voltage transformers in the event of a ground and of the occurrence thereduring of a d-c component in the displacement voltage, is limited to such a value that the functioning of the voltage transformers is substantially ensured. In general, therefore, the design of the resistor depends on the magnitude of the expected d-c transformers used and will thus vary from particular application to particular application.

In principle, the secondary windings of the three voltage transformers of the circuit arrangement of the invention can be connected in any fashion. Thus, for example, the windings may be open, i.e., have no connection. However, in practice it has been found advantageous to load these windings. More particularly, because of the nonlinear magnetization characteristic of voltage transformers, the magnetizing current of the transformers contains harmonics, of which the third harmonic is quite pronounced. This harmonic results in a third-order harmonic in the voltage between the neutral point and ground. The aforesaid loading of the secondary windings has thus been found to reduce this harmonic.

In one embodiment of the invention, the secondary windings of the voltage transformers are connected together to form a delta circuit and an ohmic resistor is inserted into this delta circuit as a common load. In an alternate embodiment of the invention, the secondary windings are not delta connected, but instead each is connected to a separate ohmic resistor as its load. The former embodiment wherein the delta connection and common load are used has the advantage over the latter embodiment employing separate resistors of requiring one rather than three resistors. However, the single resistor must be designed for a voltage three times as high as that of the separate resistors.

For safety reasons, it is advisable to connect the secondary windings at some point to protective ground.

In general, in designing circuit arrangements of the present type, it is also advantageous to separate potential-wise the measuring circuit from the evaluation circuit. Thus, in a further embodiment of the present invention, the current-measuring circuit comprises a d-c transformer whose input is connected between the high value resistor and ground and whose output is connected to a load resistor from which can be derived an appropriate indicating signal. In this case, the d-c transformer is arranged so as not to be at a high potential.

In a further aspect of the present invention, the apparatus thereof is made to include the aforesaid static converter and a further converter for forming a frequency changer. In this case, the apparatus is also provided with a further circuit arrangement including a further current-measuring circuit for detecting grounds and with means for adding the alarm signals of the current-measuring circuit and the further current-measuring circuit.

The aforesaid construction of the present invention is highly advantageous due to the following reasons. The converter operation of the two converters causes the occurrence at the neutral points of the circuit and further circuit arrangements of high harmonic voltages having opposite phases. These harmonics thus cancel when added in the adding member which may, for example, be a summing amplifier, so that the voltage is approximately zero at the output of the latter. In the event of a ground, however, displacement voltages with the same phase occur at the two neutral points. The appearance of a ground is, therefore, evidenced by a particularly distinct signal output. This leads to a highly reliable sensitive and fast indication and/or initiation of protective measures.

The apparatus of the present invention is particularly suitable for the monitoring of grounds in high-voltage systems with one or several converters. Such high-voltage systems may have voltages of, for example, 500 kV. Application to converters operating at lower voltages say, for example, 500 to 1000 V, is equally possible.

The apparatus of the present invention can be manufactured with relatively few compartments and at low cost. It is important in the present apparatus that the artificial neutral point is not connected to ground directly or through only a low resistance. Due, instead to the use of a high value resistance, even a high displacement voltage still leads to a relatively small ground current. The displacement voltage can, therefore, have any waveform in the event of a ground. As a result, it is clear that the circuit arrangement can indicate not only the occurrence of a ground on the three-phase side, but also a ground on the d-c side, of the converter.

It is also particularly important that with the apparatus of the invention, the high value resistor is not loaded during normal operation of the converter. Thus, no continuous power losses are produced. Also, an undesirable temperature rise of the environment is avoided.

The alarm signal generated by the circuit arrangement of the invention can be used to operate a disconnect switch for disconnecting the voltage at the a-c leads of the converter. In such case, the high value resistor, while it must be designed for the high voltage of the converter, need only be designed for short duration power absorption, since it absorbs energy only in the time interval between the occurrence of the ground and the disconnection of the a-c network. As a result, the cost of the resistor is not unjustifiably high and it requires relatively little space.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
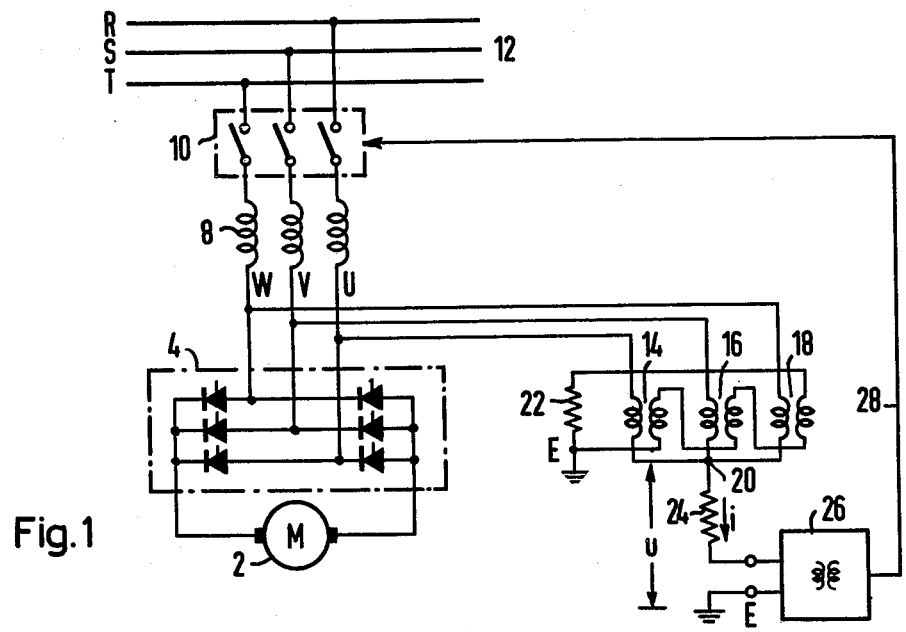
FIG. 1 shows an apparatus including a circuit arrangement for detecting grounds in accordance with the principles of the present invention.

In FIG. 1, the first ends or leads of the primary windings of three voltage transformers 14, 16, 18 are connected respectively to the a-c lines or leads U, V and W of a converter 4. The other ends or leads of these primary windings are connected together to form an artificial neutral point 20. The secondary windings of the three voltage transformers 14, 16, 18, in turn, are connected together to form a triangle or delta circuit connection. An ohmic resistor 22 is connected into this delta circuit as a common load.

The resistor 22 is selected to have a relatively low resistance which may, for example, be 100 or 1000 ohm. If ordinary voltage transformers are used, it is further designed, for example, for a voltage of 300 V. The function of the resistor 22 is to substantially prevent the occurrence of high amplitude, high frequency oscillations in the circuit. In particular, it significantly reduces harmonics of the neutral point voltage between the neutral point 20 and ground. As shown, the delta circuit is connected to ground at E, such grounding being desirable for safety reasons but not being necessary for operation of the invention.

The neutral point 20 is connected to the ground E through a series circuit of a high value resistor 24 and a current measuring circuit 26, the latter circuit having a resistance which is low relative to the resistor 24. In the normal operating condition of the converter 4, (i.e., no unwanted grounds in the converter), the artificial neutral point 20 is approximately at ground potential. In the event of an unwanted ground, however, a displacement voltage u occurs which can take on a high value. The displacement voltage u, thus, causes a proportional ground current i to flow in the high value resistor 24. This current is measured by means of the current-measuring circuit 26 and is converted thereby into a disconnect signal. The latter signal is applied via a signal line 28 to the switch 10 which disconnects the leads U, V, W of the converter 4 from the phases R,S,T of the three-phase source 12.

The high value resistor 24 is designed to ensure proper functioning of the voltage transformers 14, 16, 18 in the event of a ground of the converter 4 on its d-c side, i.e., if one of the two leads between the converter and the load 2 is connected to ground E. The resistor, therefore, is designed so that the permissible magnetic bias of the voltage transformers 14, 16, 18 is not exceeded in the worst case of a short to ground. In particular, in designing the resistor 24 for worst case operation, account must be taken for the occurrence of a d-c component in the displacement voltage u which corresponds to one-half of the value of the rectified voltage at the load 2 for maximum drive of the converter 4.

In one operative embodiment of the present invention used in conjunction with a converter 4 operating at 500 kV, a resistance of about 1 megohm was found to be adequate for the resistor 24. As many factors enter into the design of resistor 24, the aforesaid value should be considered only as a rough guideline for other possible embodiments. In this operative embodiment, the value of the resistor 22 was about 100 ohm. The latter value should also be considered as a rough guideline for other possible embodiments.

While the high-resistance resistor 24 must be designed for high voltages, it need only be designed for relatively small power dissipation. This power is determined by the time between the occurrence of a ground and the disconnection of the a-c lines U, V, W by the opening of the switch 10 by means of the current-measuring circuit 26.

As already mentioned above, during the occurrence of a short, a ground current i proportional to the displacement voltage u flows through the high value resistor 24. This current is evaluated by the current-measuring circuit 26. Advantageously, potential-free signal transmission of the current can be realized by the use of a d-c transformer in the circuit 26. Such a transformer is indicated symbolically in FIG. 1 in the block illustrating the current-measuring circuit 26.

Figure 2:
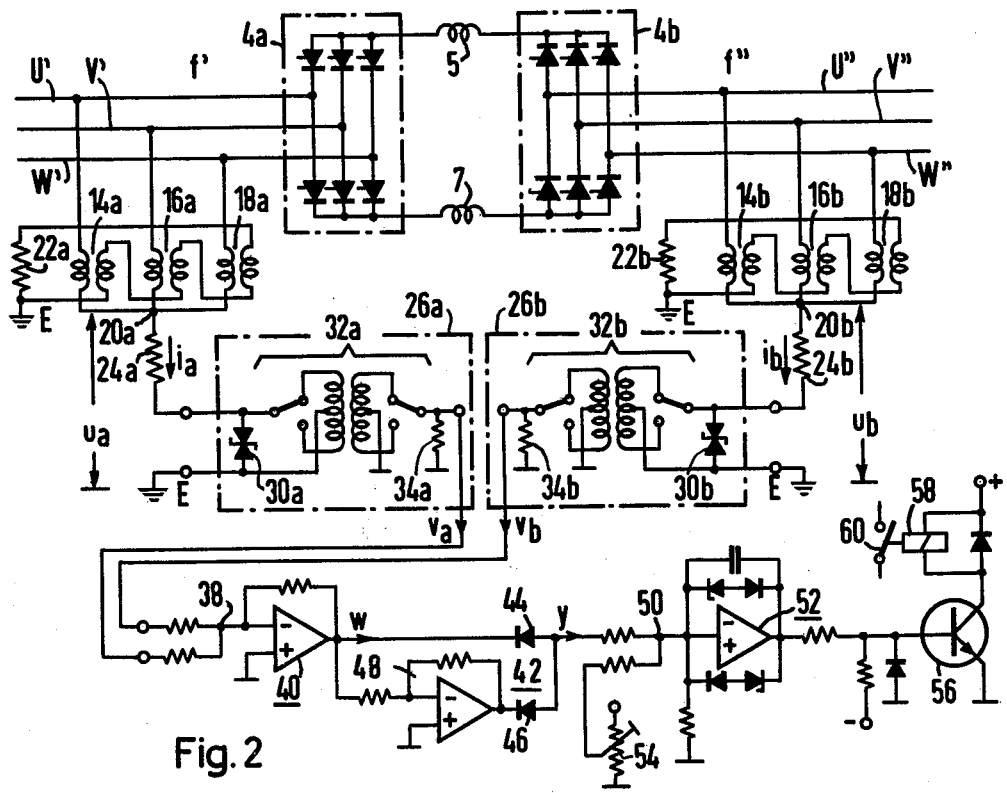
FIG. 2 shows an apparatus including two circuit arrangements for detecting grounds in accordance with the principles of the present invention.

In FIG. 2, two high-voltage converters 4a and 4b are connected, via smoothing chokes 5 and 7, to form a frequency changer or converter. The converters 4a and 4b have a-c leads U', V', W' and U'', V'', W'' and associated frequencies f' and f''. The frequency f' may be a constant, for example, 50 Hz, and the frequency f'' may be variable. The converters 4a, 4b are provided with substantially identical circuit arrangements for detecting grounds, the latter circuits being connected to each other on the output side. The components of the circuit arrangement associated with converter 4a have been labelled with the subscript a and those of converter 4b with the subscript b. Both circuit arrangements have substantially the same design as that of the circuit arrangement of FIG. 1.

In FIG. 2, the three-phase sides of the respective frequency changer 4a, 4b, are connected to the first ends of the primary windings of the voltage transformers 14a, 16a, 18a and 14b, 16b, 18b, respectively. The second ends of the primary windings of the transformers are connected together to form respective neutral points 20a, 20b. The latter neutral points, in turn, are connected to ground E via the series circuits comprised of high value resistors 24a and 24b and current measuring circuits 26a and 26b, respectively.

The inputs of the current-measuring circuits 26a, 26b are connected to respective pairs of oppositely poled series connected Zener diodes 30a, 30b. These pairs of Zener diodes ensure that the input voltage to their respective circuit does not exceed the value of the Zener voltage. Respective d-c transformer 32a and 32b are further connected to the inputs of the current-measuring circuits 26a and 26b. These d-c transformers serve to transmit the measured ground currents $i_a$ and $i_b$, respectively, at floating potential and facilitate the subsequent further processing of these currents. The d-c transformers 32a, 32b are shown schematically in FIG. 2 and may comprise choppers constructed from electronic components in the usual manner. The transformation ratio of these transformers may, for example, be 1:1. In such case, the current signals $i_a$ and $i_b$ will also be transmitted, at floating potential, in the ratio 1:1.

Load resistors 34a, 34b are connected to the outputs of the d-c transformer 32a, 32b. These resistors are further connected to a chassis rather than to the ground E. Thus, the further signal processing of the signals from the transformers 26a and 26b is with reference to the aforesaid chassis potential and not ground potential. The output signals $v_a$, $v_b$ at the load resistors 34a and 34b are directly proportional to the currents $i_a$ and $i_b$, respectively, and also directly proportional to the displacement voltages $u_a$ and $u_b$, respectively. They typically will be in the voltage range 0 to about 10 V, which is advantageous for the further processing by operational amplifiers. The voltages $u_a$, $u_b$ and $v_a$, $v_b$ as well as the currents $i_a$, $i_b$ may be pure a-c signals or d-c signals upon which are superposed a-c signals.

Six-pulse operation of the converters 4a and 4b under normal operation (i.e., without the presence of a ground) results in voltages $u_a$ and $u_b$ at the two neutral points 20a, 20b which primarily contain harmonics, of which those of the third order (frequencies $3f$ and $3f'$) have the largest amplitude. The resultant third order harmonics are, however, of substantially opposite phase. As a result, the corresponding third order harmonics which substantially form the voltages $v_a$ and $v_b$ are also of opposite phases. Application of the latter two voltages to the summing input 38 of the adding member 40 thus results in a substantially zero voltage at the output W of the member. Typically, the adding member 40 may be a summing amplifier such as, for example, an operational amplifier.

In the event of a short to ground, on the other hand, the displacement voltages $u_a$, $u_b$ at the neutral points 20a, 20b have in-phase third order harmonics. As a result, the voltages $v_a$ and $v_b$ at the summing point 38 will, likewise, have corresponding in-phase third order harmonics. This, in turn, results in the output W of the adding member 40 being greater than zero and, in particular, including an a-c component on which a d-c component may be superimposed.

The adding member 40 is followed by a rectifier circuit 42. The latter circuit includes two parallel circuit branches. One of these branches contains a diode 44 and the other branch contains a diode 46 in series with an inverter 48. The rectifier circuit 42 ensures that both polarities of the sum voltage $(u_a+u_b)$ can be sensed.

The rectified voltage y is fed to the reference point 50 of a multivibrator 52. Also applied to the reference point 50 is a preset voltage which is derived from a setting device shown as a potentiometer 54. The potentiometer 54 permits the response point of the multivibrator 52 to be set and thereby, the permissible interference level.

The output of the multivibrator 52 is coupled to a transistor 56 which is switched into conduction when the output of the multivibrator suitably changes state. A relay 58 is connected in series with the transistor 56. An alarm signal for the occurrence of a short to ground, and/or a disconnect signal for the network U', V', W' and/or U", V", W" and/or d-c terminals of the converters, 4a, 4b is delivered when the make contact 60 of the relay is closed.

The interlinking of the two circuit arrangements for detecting grounds in the converters 4a and 4b as shown in FIG. 2 has the advantage that a high response sensitivity can be achieved.

Figure 3:
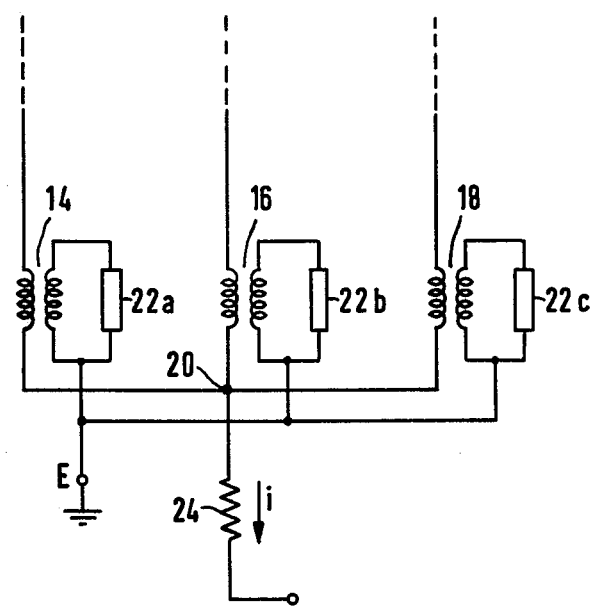
FIG. 3 shows a partial view of a modification of the apparatus of FIG. 1.

FIG. 3 shows a partial view of a modified form of the circuit arrangement of FIG. 1. In this case, three voltage transformers 14, 16, 18 are again provided with primary windings having first and second ends connected together as in FIG. 1. In FIG. 3, however, the secondary windings of the transformers are loaded individually. As shown, the secondary windings are shunted by the separate ohmic resistor 22a, 22b, 22c, respectively. As is also shown, each secondary winding is further connected to the ground E.

In summary, it should be noted that the switch 10 in FIG. 1 can in general be a power circuit breaker. Particular circuit breakers that can be used as the switch 10 are marketed under the designation "Indoor Power Circuit Breakers 3AB and 3AC (T-Breakers)" by the firm Siemens AG, Berlin and Munich, Federal Republic of Germany. Other breakers can also be used. Additionally, the current measuring circuits 26, 26a and 26b in FIGS. 1 and 2 can likewise be commercially available components. Thus, for example, the so-called "d-c transformers" of the firm Knick, Elektronische Messgeraete (Electronic Measuring Instruments) can be used for such circuits.

What is claimed is:

1. In an apparatus including a circuit arrangement for use in detecting unintentional grounds in a static converter having three a-c leads, the circuit arrangement including: three electrical components each including first and second leads, the first leads of said three components being connected to said three a-c leads, respectively, and the second leads of said three components being connected together to form an artificial neutral point; current-measuring circuit means connected between said neutral point and earth ground for generating an alarm signal in the event of an unintentional ground in said converter; the improvement comprising:
   three voltages transformers each having a primary winding, said primary windings of said three voltage transformers forming said three electrical components;
   and a current limiting resistor connected between said neutral point and earth ground and in series with said current measuring circuit means.

2. In an apparatus in accordance with claim 1, the improvement wherein:
   each of said three voltage transformers includes a secondary winding, said secondary windings being connected together to form a delta circuit;
   and said circuit arrangement further includes an ohmic resistor connected in said delta circuit as a common load.

3. In an apparatus in accordance with claim 2, the improvement wherein:
   said delta circuit is connected to earth ground at one point.

4. In an apparatus in accordance with claim 1, the improvement wherein:
   each of said voltage transformers includes a secondary winding;
   and said circuit arrangement further includes three ohmic resistors connected to said secondary windings of said three voltage transformers, respectively, as loads.

5. In an apparatus in accordance with claim 4, the improvement wherein:
   each of said secondary windings is connected to earth ground.

6. In an apparatus in accordance with claim 1, the improvement wherein:
   said current-measuring circuit means comprises:

a d-c transformer having an input connected between said neutral point and earth ground;

and a load resistor connected to the output of said transformer, said alarm signal being derived from said resistor.

7. In an apparatus in accordance with claim 6, the improvement wherein:

said circuit arrangement further includes two Zener diodes connected in series with opposed polarities, said series connection of Zener diodes being connected in shunt across the input of said d-c transformer for protection against overvoltages.

8. In an apparatus in accordance with claim 1, the improvement wherein:

said apparatus further includes:

said static converter and a further converter having three further a-c leads;

and a further electrical circuit arrangement including:

three further electrical components each including first and second further leads, said first further leads being connected to said further a-c leads, respectively, and the second further leads being connected together to form a further artificial neutral point;

and further current-measuring circuit means connected between said further neutral point and earth ground for generating a further alarm signal in the event of an unintentional ground in said further converter;

and means for adding said alarm signal and further alarm signal.

9. In an apparatus in accordance with claim 8, the improvement wherein:

said apparatus includes:

three further voltage transformers each having a primary winding, said primary windings of said three further voltage transformers forming said three further electrical components;

and a further current limiting resistor connected between said further neutral point and earth ground and in series with said further current-measuring circuit means.

10. In an apparatus in accordance with claim 8, the improvement wherein:

said apparatus further includes a rectifier circuit connected to the output of said adding means.

11. In an apparatus in accordance with claim 10, the improvement wherein:

said rectifier circuit is followed by a multivibrator.

12. In an apparatus in accordance with claim 11, the improvement wherein:

said multivibrator includes means for setting its trigger point.

13. In an apparatus in accordance with claim 1, the improvement wherein:

said apparatus further includes an alarm relay responsive to said alarm signal.

* * * * *